(12) United States Patent
Pirmann et al.

(10) Patent No.: US 7,498,599 B2
(45) Date of Patent: Mar. 3, 2009

(54) APPARATUS AND METHOD FOR READING OUT STORAGE PHOSPHOR PLATES

(75) Inventors: Anton Pirmann, Munich (DE); Rudolf Loistl, Unterhaching (DE); Otto Butz, Neufahrn (DE); Alfons Kastl, Aying (DE)

(73) Assignee: Agfa HealthCare N.V., Mortsel (BE)

( * ) Notice: Subject to any disclaimer, the term of this patent is extended or adjusted under 35 U.S.C. 154(b) by 0 days.

(21) Appl. No.: 11/836,464

(22) Filed: Aug. 9, 2007

(65) Prior Publication Data

US 2008/0054199 A1 Mar. 6, 2008

(30) Foreign Application Priority Data

Aug. 29, 2006 (EP) ................... 06119719

(51) Int. Cl.
*G03B 42/02* (2006.01)
(52) U.S. Cl. ..................................................... 250/589
(58) Field of Classification Search ................... 250/589
See application file for complete search history.

(56) References Cited

U.S. PATENT DOCUMENTS

| 3,652,853 | A | * | 3/1972 | Williner et al. ............. 378/182 |
| 4,787,521 | A | | 11/1988 | Utsumi et al. |
| 4,837,064 | A | | 6/1989 | Tschudin-Mahrer |
| 5,772,202 | A | | 6/1998 | Singer et al. |
| 6,461,062 | B2 | | 10/2002 | Hofmuth et al. |
| 6,644,875 | B1 | * | 11/2003 | Sakaino et al. ............. 400/579 |
| 2007/0114479 | A1 | | 5/2007 | Heinz et al. |
| 2007/0145312 | A1 | | 6/2007 | Muller et al. |

FOREIGN PATENT DOCUMENTS

| DE | 91 15 874 | 5/1992 |
| DE | 197 24 032 A1 | 12/1998 |

(Continued)

OTHER PUBLICATIONS

European Search Report from EP06119719.0, filed on Aug. 29, 2006.
English Translation of Japanese Patent Publication No. 2508855, published Jun. 1996.

*Primary Examiner*—David P Porta
*Assistant Examiner*—Shun Lee
(74) *Attorney, Agent, or Firm*—Houston Eliseeva, LLP

(57) ABSTRACT

An apparatus for reading out storage phosphor plates (2) for storing X-ray information with one or more rotating conveyance rolls (11 to 14) for conveying the storage phosphor plate (2), an alignment edge (19, 22) to which the storage phosphor plate (2) can be aligned, and a read-out device for reading out the X-ray information stored in the storage phosphor plate (2). For more reliable alignment of the storage phosphor plate (2), in particular also with a storage phosphor plate (2) orientated substantially horizontally, provision is made such that the storage phosphor plate (2) is conveyed by the rotating conveyance rolls (11, 12) in direction (R, R') towards the alignment edge (19, 22) and a control device is provided for setting a pressure with which the conveyance rolls (11, 12) press onto the storage phosphor plate (2), the pressure being set such that a slack or slippage occurs between the rotating conveyance rolls (11, 12) and the storage phosphor plate (2) being conveyed when the storage phosphor plate (2) comes into contact with the alignment edge (19, 22), by means of which the storage phosphor plate (2) can change its orientation and thus be aligned to the alignment edge (19, 22).

25 Claims, 3 Drawing Sheets

FOREIGN PATENT DOCUMENTS

| | | |
|---|---|---|
| DE | 197 24 034 A1 | 12/1998 |
| DE | 197 52 925 A1 | 6/1999 |
| EP | 1 014 173 A1 | 6/2000 |
| EP | 1 034 443 B1 | 9/2000 |
| EP | 1 065 523 A2 | 1/2001 |
| JP | 2508855 Y | 6/1996 |
| JP | 2000-272780 A | 10/2000 |
| JP | 2000-302282 A | 10/2000 |

* cited by examiner

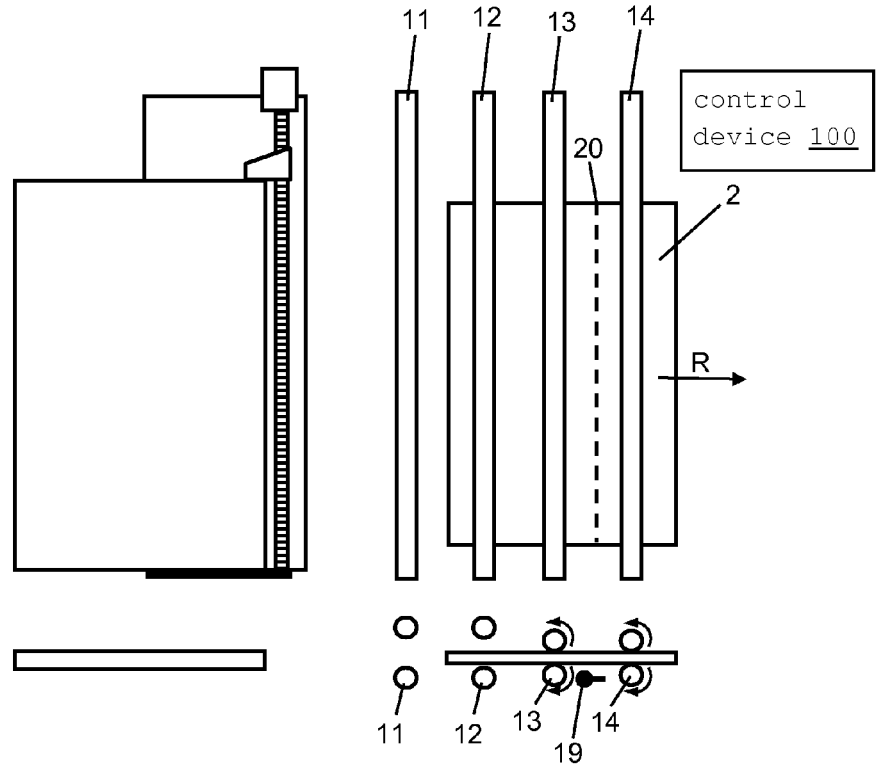
Fig. 5
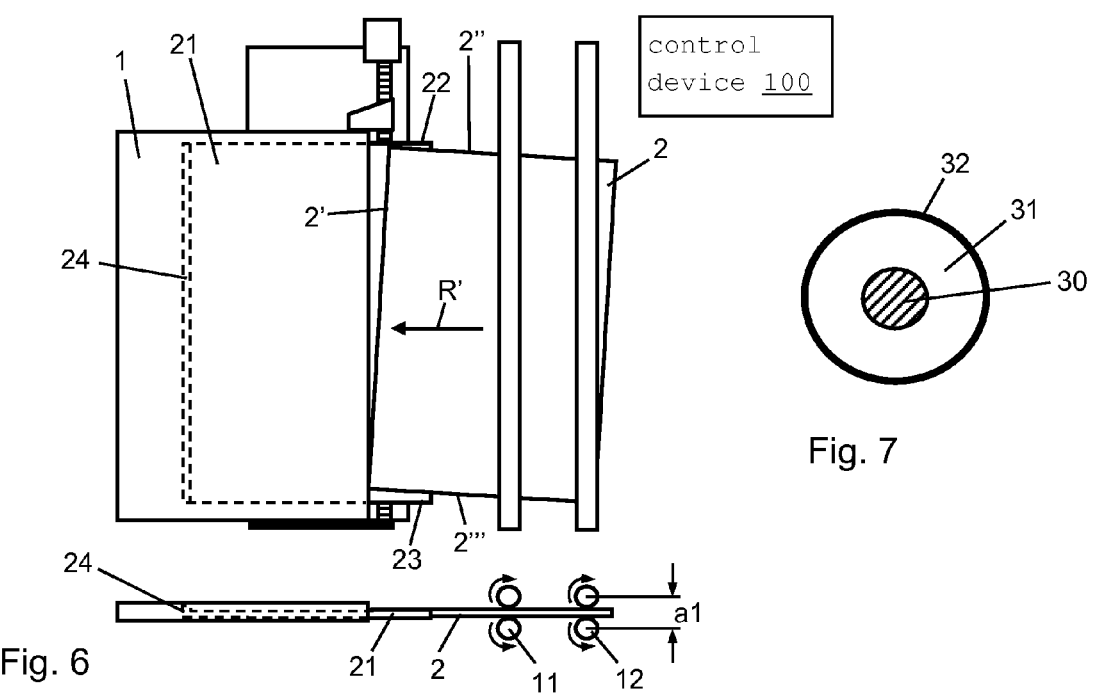
Fig. 6
Fig. 7

APPARATUS AND METHOD FOR READING OUT STORAGE PHOSPHOR PLATES

RELATED APPLICATIONS

This application claims priority to European Patent Application No. EP 06119719.0, filed on Aug. 29, 2006, which is incorporated herein by reference in its entirety.

BACKGROUND OF THE INVENTION

One possibility for recording X-ray pictures is to store the X-ray radiation passing through an object, for example a patient, as a latent picture in a so-called storage phosphor layer. In order to read out the latent picture, the storage phosphor layer is irradiated with stimulation light and so stimulated into emitting emission light. The emission light, the intensity of which corresponds to the picture stored in the storage phosphor layer, is collected by an optical detector and converted into electrical signals. The electrical signals are further processed as required, and are finally made available for analysis, in particular for medical/diagnostic purposes, by displaying them on appropriate display equipment such as e.g. a monitor or printer.

A device for reading-out storage phosphor plates is known from EP 1 014 173 B1 with which the leading edge of a storage phosphor plate which is orientated substantially vertically comes to rest, due to the force of gravity, against a pivotable support bar and can be moved by a slide along the support bar. In cases where the storage phosphor plate is orientated substantially horizontally, it can not be guaranteed, however, that the storage phosphor plate can reliably rest with its leading edge constantly against the support bar and be moved along the latter or being aligned to the latter.

SUMMARY OF THE INVENTION

The application relates to an apparatus and to a corresponding method for reading out storage phosphor plates for storing X-ray information.

It is the object of the invention to specify an apparatus and a corresponding method with which reliable alignment of the storage phosphor plate, in particular also with a substantially horizontally orientated storage phosphor plate, is made possible.

The solution according to the invention is based upon the idea of the storage phosphor plate being conveyed by one or more rotating conveyance rolls towards the alignment edge and a control unit being provided for setting a pressure with which the conveyance rolls press onto the storage phosphor plate, the pressure being set so that a slack or slippage occurs between the rotating conveyance rolls and the storage phosphor plate being conveyed when the storage phosphor plate comes into contact with the alignment edge, by means of which the orientation of the storage phosphor plate changes its orientation and is thus aligned to the alignment edge.

By using rotating conveyance rolls with which the storage phosphor plate is conveyed towards the alignment edge, it is guaranteed that the storage phosphor plate reliably comes to rest against or on the alignment edge, even in the case of horizontal orientation and conveyance. Moreover, by setting, according to the invention, the pressure with which the conveyance rolls press onto the storage phosphor plate, a slack or slippage is made possible between the rotating conveyance rolls and the storage phosphor plate being conveyed when the latter rests at least partially against the alignment edge during conveyance. The result of this slack or slippage is that the circulation speed of one or more of the conveyance rolls is greater than the speed with which the storage phosphor plate is moved towards the alignment edge.

In the case that the leading edge of the storage phosphor plate does not extend parallel to the alignment edge, i.e. the storage phosphor plate is twisted somewhat in relation to its aligned orientation, at first only a corner of the leading edge of the storage phosphor layer comes into contact with the alignment edge. The result of the slack or slippage occurring between the rotating conveyance rolls and the storage phosphor plate is then that the storage phosphor plate is turned about this contact point until the leading edge rests fully against the alignment edge and the storage phosphor plate is aligned to the alignment edge.

By means of the invention reliable alignment of the storage phosphor plate to the alignment edge is guaranteed, in particular also with horizontal orientation of the storage phosphor plate.

Preferably, at least one conveyance mating roll is provided which comprises two rotating conveyance rolls which are disposed to either side of the storage phosphor plate and press from both sides onto the storage phosphor plate. By using one or more rotating conveyance mating rolls, particularly reliable alignment of the storage phosphor plate to the alignment edge is guaranteed.

Moreover, it is preferred if the control device can set at least two different distances between the conveyance rolls and the storage phosphor plate and—in the case of conveyance mating rolls—between the conveyance rolls of a conveyance mating roll, by means of which at least two different pressures with which the conveyance rolls press onto the storage phosphor plate can be set. In this way one can simply achieve precise setting of the pressure with which the conveyance rolls press onto the storage phosphor plate.

With this design it is preferred if, with a first distance, a first pressure is set with which a slack or slippage can occur between the rotating conveyance rolls and the storage phosphor plate conveyed in the direction of conveyance if the storage phosphor plate comes into contact with the alignment edge. In particular, provision is made here such that with a second distance, a second pressure is set, the second distance being smaller than the first distance, and the second pressure being greater than the first pressure so that no slack or slippage can occur between the rotating conveyance rolls and the storage phosphor plate being conveyed in the direction of conveyance. With this design the rolls can be switched from a simple "conveyance mode", in which they are spaced apart from the storage phosphor plate or from one another by a second distance and convey the storage phosphor plate substantially without any slack or slippage, into an "alignment mode" in which they are spaced apart from the storage phosphor plate or from one another by a first distance, and so both convey the storage phosphor plate towards the alignment edge and also align it to the alignment edge.

In a preferred embodiment of the apparatus, provision is made such that the conveyance rolls respectively include a jacket made of an elastic material which has a hardness of in the region of between 30° and 60° Shore, and in particular between 40° and 50° Shore. By choosing an elastic material in this hardness range, particularly reliable setting of the pressure exerted upon the storage phosphor plate and so generation of the required slack or slippage between the conveyance rolls and the storage phosphor plate is made possible.

Advantageously, a conveyance roll includes a metallic shaft which forms the core of the roll. The jacket disposed around the roll core of the conveyance roll is preferably made of a foam, in particular a polyurethane foam the hardness of which on the one hand and the compression properties of which on the other hand are particularly suitable for setting the required pressures between the conveyance rollers and the storage phosphor plate.

Moreover, it is preferred if the outer region of the jacket, with which the latter comes into contact with the storage phosphor plate, has a layer made of a material the hardness of which is greater than the hardness of the elastic jacket. In particular here, a material is chosen which has a particularly high level of abrasion resistance and stable friction properties. A layer of polyurethane is particularly suitable for these purposes. By choosing, according to the invention, the material for the layer located on the jacket, a high level of reproducibility of the slack or slippage required for alignment of the storage phosphor plate is achieved.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 is a schematic diagram showing the apparatus shown in FIG. 1 in a fifth phase;

FIG. 6 is a schematic diagram showing a further exemplary embodiment of the apparatus according to the invention; and FIG. 7 is a schematic diagram showing a preferred embodiment of the conveyance rolls.

DETAILED DESCRIPTION OF THE PREFERRED EMBODIMENTS

Figure 1:
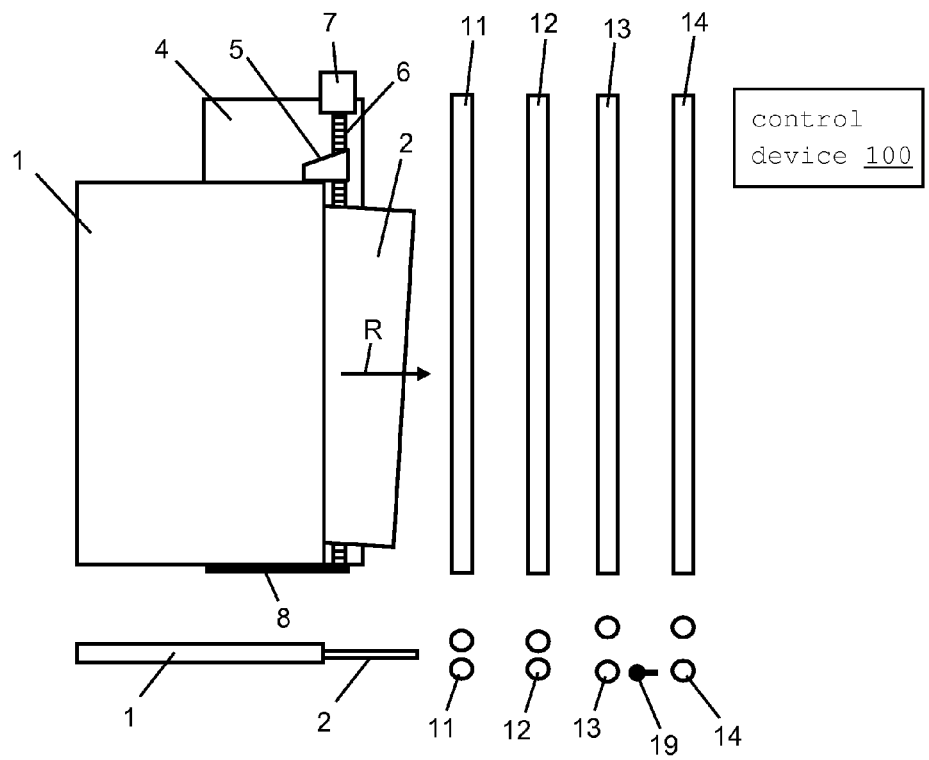
FIG. 1 is a schematic diagram showing an exemplary embodiment of the apparatus according to the invention in a first phase.

The upper section of FIG. 1 shows a highly diagrammatic top view of an exemplary embodiment of the apparatus according to the invention in a first phase. A cassette 1, in which a storage phosphor plate 2 is located, is made available to an insertion device and fixed here in a defined position. For this, the cassette is placed on a support 4, pressed by a clamping wedge 5 against a stop edge 8 and thus fixed in this position. In this example the clamping wedge 5 runs on a threaded rod 6 which is driven by a stepper motor 7.

After fixing the cassette 1 and opening a closure flap pivotably disposed on the face side of the cassette 1, the storage phosphor plate 2 is removed from the cassette 1 in direction R using a removal mechanism (not shown) and conveyed to first and second conveyance mating rolls 11 and 12 and 13 and 14.

A cross-section of the apparatus described is shown in the lower section of FIG. 1. Disposed between the second conveyance mating rolls 13 and 14 is an alignment edge 19 which extends substantially parallel to the second conveyance mating rolls 13 and 14, and can be pivoted into and out of these (as shown in the example) in the conveyance path lying between the two bottom conveyance rolls of the second conveyance mating rolls 13 and 14.

These operations are controlled or orchestrated by control device 100.

Figure 2:
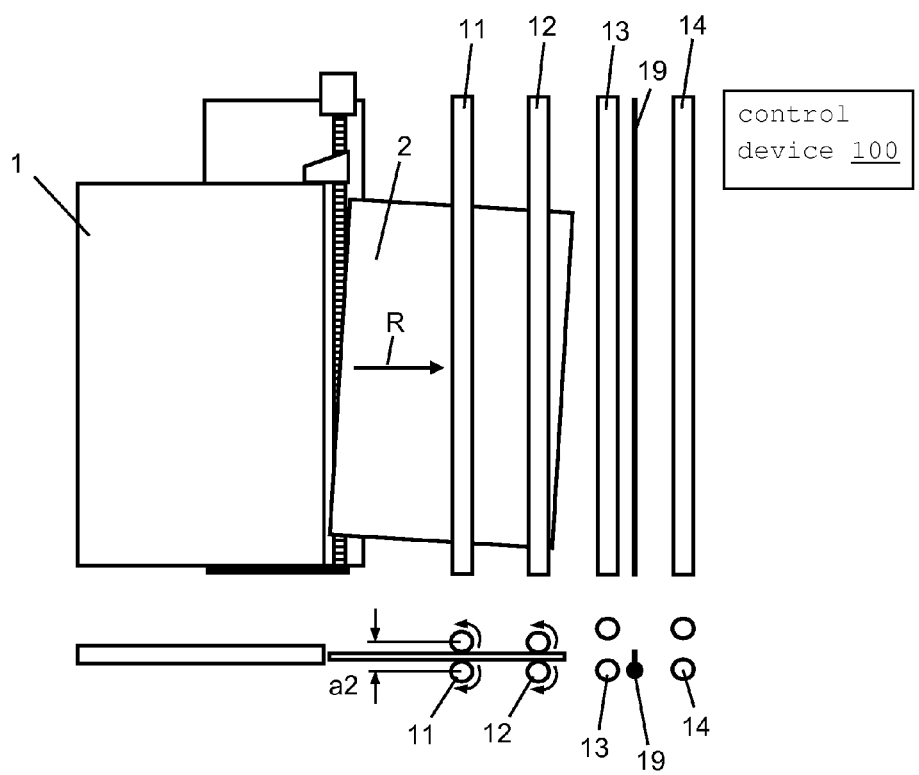
FIG. 2 is a schematic diagram showing the apparatus shown in FIG. 1 in a second phase.

FIG. 2 shows a second phase of the exemplary embodiment shown in FIG. 1, orchestrated by control device 100, the storage phosphor plate 2 being located fully outside of the cassette 1 and being conveyed further by the driven and rotating first conveyance mating rolls 11 and 12 in direction R towards the alignment edge 19 which is now folded into the conveyance path. Furthermore, in this phase the respective conveyance rolls of second conveyance mating rolls 13 and 14 are open, whereas the conveyance rolls of the first conveyance mating rolls 11 and 12 press onto the storage phosphor plate 2 and convey the latter in direction R. The rotation axes of the respective bottom and top conveyance rolls of the first conveyance mating rolls 11 and 12 have a second distance a2 here.

Figure 3:
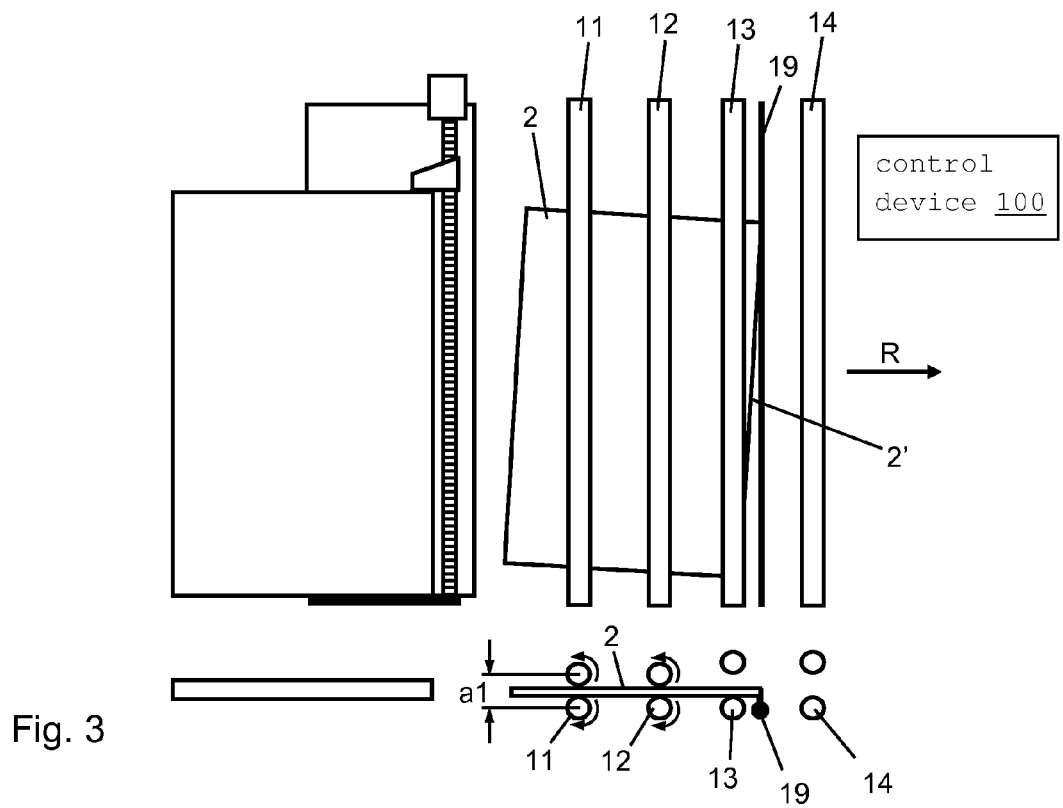
FIG. 3 is a schematic diagram showing the apparatus shown in FIG. 1 in a third phase.

In the third phase shown in FIG. 3, orchestrated by control device 100, which follows the second phase, in the region of one of its corners the leading edge 2' of the storage phosphor plate 2 abuts against the alignment edge 19. Furthermore, the second conveyance mating rolls 13 and 14 remain open in this phase, and the first conveyance mating rolls 11 and 12 exert a pressure upon the storage phosphor plate 2 which is reduced in relation to the pressure of the phase shown in FIG. 2.

Figure 4:
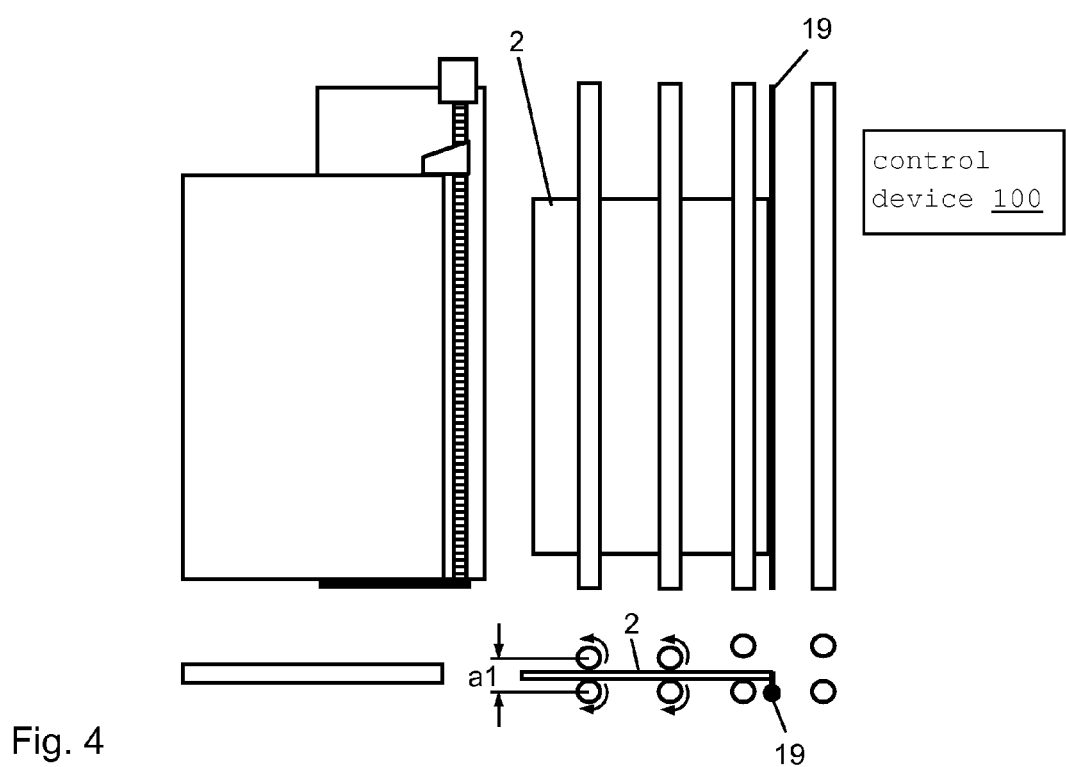
FIG. 4 is a schematic diagram showing the apparatus shown in FIG. 1 in a fourth phase.

This is achieved by setting a first distance a1 between the respective top and bottom conveyance rolls of the first conveyance mating rolls 11 and 12, and this distance is increased in relation to the second distance a2 of the phase shown in FIG. 2. The pressure which is exerted by the first conveyance mating rolls 11 and 12 onto the storage phosphor plate 2 is set in this way such that from the time at which the storage phosphor plate 2 abuts against the alignment edge 19, a slack or slippage occurs on the one hand between the rotating first conveyance mating rolls 11 and 12 and on the other hand the storage phosphor plate 2. The result of this slack or slippage is that the storage phosphor plate 2 is turned about the contact point with the alignment edge 19 by means of which its leading edge 2' is aligned along the alignment edge 19. The result of this alignment process is shown in FIG. 4.

FIG. 5 shows a further phase, orchestrated by control device 100, in which the alignment edge 19 is pivoted back out of the conveyance path between the two second conveyance mating rolls 13 and 14, and the latter convey the storage phosphor plate 2 further in direction R. The conveyance rolls of the first conveyance mating rolls 11 and 12 are open in this phase.

With the conveyance of the storage phosphor plate 2 in direction R shown here, the latter is moved through a read-out unit for reading out X-ray information stored in the storage phosphor plate 2. Here, the storage phosphor plate 2 is read out in the read-out unit line by line, individual points of a line 20 on the storage phosphor plate being respectively irradiated, one after the other, with stimulation light—as with so-called flying spot scanners—or at the same time—as with so-called line scanners—and the emission light stimulated here is collected by an optical detector. The design of corresponding read-out units is described e.g. in EP 1 065 523 A2 and EP 1 034 443 B1.

The different pressures and distances a1 and a2 and the opening of the conveyance mating rolls 11 and 12 can be set by different mechanisms, such as e.g. by guide rails or other guides, cables or threaded rods. These mechanisms are driven by a motor, such as e.g. a stepper motor which is controlled by the control device 100.

FIG. 6 shows a further exemplary embodiment of the invention in a phase, orchestrated by control device 100, in which the storage phosphor plate 2 is conveyed back in direction R' into the cassette following read-out. In the example shown here a support 21 is provided in the cassette 1 which in the phase shown projects partially out of the cassette 1 and on which the storage phosphor plate 2 should be set down. For this, the storage phosphor plate 2 is moved by the first conveyance mating rolls 11 and 12 in direction R'.

In the case shown, the storage phosphor plate 2 is not correctly aligned in relation to the support 21 and abuts in the region of a corner of its leading edge 2' against a raised edge 22 in the side region of the support 21. The situation can also arise where the storage phosphor plate 2 touches a raised edge 23 in the side region of the support 21 with a side edge 2'''. Finally, it is possible for the storage phosphor plate 2 to abut against the raised edge 24 at the rear end of the support 21 with the lower corner of the leading edge 2' when the conveyance back has ended.

In these cases the raised edges 22, 23 and 24 of the support 21 have a similar effect to the alignment edge 19 already described in detail above (see FIGS. 1 to 5), i.e. the storage phosphor plate 2 comes into contact with the edge 22, 23 and 24 of the support 21 and is both conveyed in direction R' and aligned to the respective edge 22, 23 and 24.

The first distance a1 between the respective conveyance rolls of the first conveyance mating rolls 11 and 12 is set here so that when the storage phosphor plate 2 comes into contact with the raised edge 22, 23 or 24 a slack or slippage occurs between the first conveyance mating rolls 11 and 12 on the one hand and the storage phosphor plate 2 on the other hand, the result of which is that the storage phosphor plate 2 is turned somewhat anti-clockwise and aligned with its edge 2'', 2''' or 2' to the raised edge 22, 23 or 24 of the support 21. In this way it is possible to set the storage phosphor plate 2 down reliably and precisely on the support 21.

The support 21 can then be introduced together with the storage phosphor plate 2 located on top of it reliably and without any problem into the cassette 1.

FIG. 7 shows a preferred embodiment of the individual conveyance rolls of the first conveyance mating rolls 11 and 12. As can be seen in the cross-section shown here, the conveyance rolls have a core 30 which is preferably formed by a driven shaft made of metal. The core 30 is surrounded with a jacket 31 which is made of foam, in particular polyurethane foam, and preferably has a hardness of in the region of between approximately 30° and 60° Shore. The jacket 31 is provided with a coating 32 which is preferably made of polyurethane and has a clearly higher level of hardness and abrasion resistance and more stable friction properties than the material of the jacket 31. With this embodiment, due to the relatively soft foam material of the jacket 31 it is easy to produce the pressures required for a slack or slippage to occur, a high level of abrasion resistance of the conveyance rolls being guaranteed at the same time.

In order to provide the slack or slippage proposed according to the invention, it is already sufficient if at least the respective top conveyance roll of least a first conveyance mating roll 11 and 12 has a jacket 31 made of the relatively soft foam described above. In this case the jacket 31 of the respective bottom conveyance roll of the conveyance mating roll 11 and 12 can be made e.g. of a relatively hard rubber material.

The second conveyance mating rolls 13 and 14 shown in FIGS. 1 to 5 preferably have a jacket made of a relatively hard rubber material in order to achieve the most slack or slippage-free and precise conveyance possible of the storage phosphor plate 2 through the read-out device.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for reading out storage phosphor plates for storing X-ray information, comprising:
   one or more rotating conveyance rolls for conveying the storage phosphor plate;
   at least one alignment edge to which the storage phosphor plate is aligned, the storage phosphor plate being conveyed by the rotating conveyance rolls in a direction towards the alignment edge;
   a read-out device for reading out the X-ray information stored in the storage phosphor plate; and
   a control device for setting a pressure with which the conveyance rolls press onto the storage phosphor plate, the control device reducing the pressure enabling slippage to occur between the rotating conveyance rolls and the storage phosphor plate being conveyed when the storage phosphor plate comes into contact with the at least one alignment edge to orient the storage phosphor plate to align to the at least one alignment edge.

2. The apparatus according to claim 1, wherein at least one conveyance mating roll comprises two of the one or more rotating conveyance rolls which are disposed to either side of the storage phosphor plate and press from both sides onto the storage phosphor plate to provide the pressure.

3. The apparatus according to claim 2, wherein the control device sets at least two different distances between the conveyance mating rolls and the storage phosphor plate, providing at least two different pressures with which the conveyance mating rolls press onto the storage phosphor plate.

4. The apparatus according to claim 2, wherein the control device sets at least two different distances between the conveyance mating rolls, providing at least two different pressures with which the conveyance mating rolls press onto the storage phosphor plate.

5. The apparatus according to claim 4, wherein with a first distance, a first pressure is set with which slippage occurs between the rotating conveyance mating rolls and the storage phosphor plate being conveyed if the storage phosphor plate comes into contact with the at least one alignment edge.

6. The apparatus according to claim 5, wherein with a second distance a second pressure is set, and the second distance being smaller than the first distance and the second pressure being greater than the first pressure so that no slippage occurs between the rotating conveyance rolls and the storage phosphor plate being conveyed.

7. The apparatus according to claim 1, wherein the conveyance rolls include a jacket made of an elastic material which has a hardness of in the range of between 30° and 60° Shore.

8. The apparatus according to claim 7, wherein the jacket is made of a foam.

9. The apparatus according to claim 7, wherein an outer region of the jacket has a layer of a material, the hardness of which is greater than the hardness of the jacket.

10. The apparatus according to claim 9, wherein the layer is made of polyurethane.

11. The apparatus according to claim 1, further comprising a support for supporting the storage phosphor plate and being inserted with the storage phosphor plate into a cassette.

12. The apparatus according to claim 11, wherein the at least one alignment edge is formed by at least one raised edge of the support.

13. The apparatus according to claim 12, wherein when the storage phosphor plate is conveyed by the rotating conveyance rolls in a direction towards the raised edge, a pressure is set with which the conveyance rolls press onto the storage phosphor plate so that slippage occurs between the rotating conveyance rolls and the storage phosphor plate being conveyed when the storage phosphor plate comes into contact with the at least one raised edge of the support to change an orientation and align the plate with the at least one raised edge of the support.

14. The apparatus according to claim 1, wherein the conveyance rolls include a jacket made of an elastic material which has a hardness of in the range of between 40° and 50° Shore.

15. The apparatus according to claim 14, wherein the jacket is made of polyurethane foam.

16. A method for reading out storage phosphor plates for storing X-ray information, comprising:
   conveying a storage phosphor plate with one or more rotating conveyance rolls to an alignment edge;
   reading out the X-ray information stored in the storage phosphor plate; and
   controlling a pressure with which the conveyance rolls press onto the storage phosphor plate so that slippage occurs between the rotating conveyance rolls and the storage phosphor plate when the storage phosphor plate comes into contact with the alignment edge to change an orientation and align the storage phosphor plate with the alignment edge.

17. A method for reading out a storage phosphor plate for storing X-ray information, comprising:
   conveying a storage phosphor plate with two rotating mating conveyance rolls from a cassette for the storage phosphor plate and to an alignment edge during a first phase in which a first distance is set between the rotating conveyance rolls;
   reading out the X-ray information stored in the storage phosphor plate; and
   increasing a distance between the same rotating mating conveyance rolls during a second phase to enable slippage to occur between the rotating mating conveyance rolls and the storage phosphor plate as the storage phosphor plate comes into contact with the alignment edge to change an orientation and align the storage phosphor plate with the alignment edge.

18. An apparatus for reading out storage phosphor plates for storing X-ray information, comprising:
   at least one pair of rotating mating conveyance rolls between which the storage phosphor plates pass for conveying the storage phosphor plates from a cassettes for holding the storage phosphor plates;
   an alignment edge to which the storage phosphor plates are aligned, the storage phosphor plates being conveyed by the pair of rotating mating conveyance rolls in a direction towards the alignment edge;
   a read-out device for reading out the X-ray information stored in the storage phosphor plates in the apparatus; and
   a control device for setting a pressure with which the pair of rotating mating conveyance rolls clamp the storage phosphor plates, the control device setting a first pressure between the rotating mating conveyance rollers during a phase in which the same pair of rotating mating conveyance rolls convey the storage phosphor plates in a direction toward the alignment edge and then reduce the pressure to a second pressure to enable slippage to occur between the same rotating mating conveyance rolls and the storage phosphor plates as the storage phosphor plates come into contact with the alignment edge to orient the storage phosphor plates to align to the alignment edge.

19. The apparatus according to claim 18, wherein the control device sets a first distance and a second distance between the conveyance rolls and the storage phosphor plates, providing first pressure and the second pressure with which the conveyance rolls press onto the storage phosphor plates, the first distance being less than the second distance.

20. The apparatus according to claim 18, wherein the mating conveyance rolls include a jacket made of an elastic material which has a hardness of in the range of between 30° and 60° Shore.

21. The apparatus according to claim 20, wherein the jacket is made of a foam.

22. The apparatus according to claim 21, wherein an outer region of the jacket has a layer of a material, the hardness of which is greater than the hardness of the jacket.

23. The apparatus according to claim 22, wherein the layer is made of polyurethane.

24. The apparatus according to claim 18, further comprising a support for supporting the storage phosphor plates and being inserted with the storage phosphor plate into a cassette.

25. The apparatus according to claim 24, wherein the at least one alignment edge is formed by at least one raised edge of the support.

* * * * *